US012101859B2

(12) United States Patent
Price et al.

(10) Patent No.: US 12,101,859 B2
(45) Date of Patent: Sep. 24, 2024

(54) ILLUMINATION LIGHT CONTROL BASED ON ORIENTATION

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/656,590

(22) Filed: Mar. 25, 2022

(65) Prior Publication Data

US 2023/0309207 A1 Sep. 28, 2023

(51) Int. Cl.
*H05B 47/105* (2020.01)
*F21V 21/084* (2006.01)

(52) U.S. Cl.
CPC ......... *H05B 47/105* (2020.01); *F21V 21/084* (2013.01)

(58) Field of Classification Search
CPC ..... H05B 45/10; H05B 47/105; F21V 23/023; F21V 23/0492; F21V 23/003; F21V 15/01; F21V 21/084; F21Y 2115/10; F21W 2131/40
See application file for complete search history.

(56) References Cited

U.S. PATENT DOCUMENTS

| | | | | |
|---|---|---|---|---|
| 10,017,274 | B2 * | 7/2018 | Schoen | B64D 47/04 |
| 10,091,854 | B1 * | 10/2018 | Brandon, II | H05B 45/18 |
| 10,667,357 | B1 * | 5/2020 | Feinbloom | H05B 45/10 |
| 11,219,111 | B2 * | 1/2022 | Lange | F21V 33/0008 |
| 2013/0155704 | A1 * | 6/2013 | Takagaki | G06V 20/584 362/466 |
| 2013/0249435 | A1 | 9/2013 | Hellkamp | |
| 2017/0164451 | A1 * | 6/2017 | Law | F21V 21/084 |
| 2019/0022870 | A1 * | 1/2019 | Miyazaki | G10L 15/075 |
| 2020/0170092 | A1 * | 5/2020 | Lange | F21V 33/0008 |
| 2020/0201045 | A1 | 6/2020 | Liu et al. | |
| 2021/0219394 | A1 * | 7/2021 | van der Sijde | H05B 45/10 |

FOREIGN PATENT DOCUMENTS

WO 2017029368 A1 2/2017

OTHER PUBLICATIONS

"International Search Report and Written Opinion Issued in PCT Application No. PCT/US22/053902", Mailed Date: May 12, 2023, 10 Pages.

* cited by examiner

*Primary Examiner* — Raymond R Chai
(74) *Attorney, Agent, or Firm* — Alleman Hall & Tuttle LLP

(57) ABSTRACT

A computing system includes an illumination light source configured to emit illumination light into an external environment and an orientation sensor configured to estimate an orientation of the illumination light source relative to the external environment. The computing system includes a logic subsystem and a storage subsystem holding instructions executable by the logic subsystem to define a light restriction zone within the external environment. Based at least in part on the orientation of the illumination light source, the illumination light source is dynamically controlled to direct the illumination light toward at least a portion of the external environment outside the light restriction zone, while mitigating emission of the illumination light into the light restriction zone.

19 Claims, 13 Drawing Sheets

ILLUMINATION LIGHT CONTROL BASED ON ORIENTATION

BACKGROUND

Electronic devices (e.g., computing devices) including suitable light sources may emit suitable wavelengths of light to illuminate an external environment. For example, flashlights and vehicle headlights may illuminate an external environment using visible wavelengths of light. Some active night-vision systems may illuminate an external environment using infrared wavelengths of light, which can help a human user to see the external environment via infrared imagery captured by a suitable camera. In some settings, uncontrolled illumination light can cause discomfort or be distracting to those in the external environment—e.g., humans, animals, etc. Uncontrolled illumination can also cause inadvertent triggering or receiving of noise at photosensitive devices in the environment. In still other cases, emitted light may be visible in a way that undesirably alerts observers to the presence of the light-emitting device and its operator. Accordingly, it may be desirable to restrict or otherwise control the emission of the illumination light.

DETAILED DESCRIPTION

Figure 1:
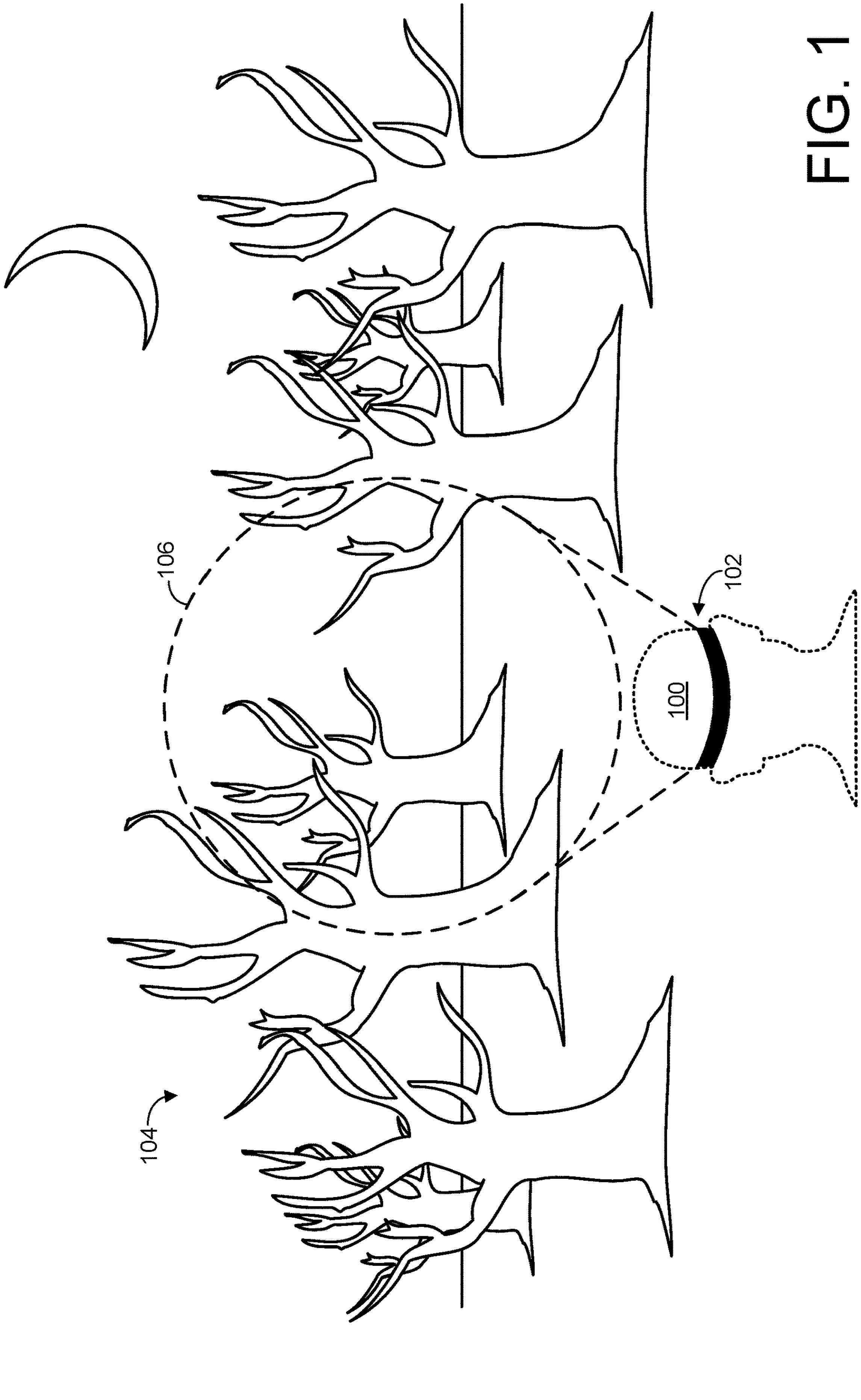
FIG. 1 schematically illustrates a computing system emitting illumination light into an external environment.

As discussed above, an illumination light source may be controlled to emit suitable wavelengths of light and illuminate an external environment. However, such illumination light may be visible to one or more other parties in the external environment—e.g., humans, animals, and/or photosensitive devices. This may be undesirable in some scenarios. For example, illumination light can be distracting or uncomfortable to potential observers—e.g., when the illumination light source emits relatively bright visible light directly toward a person's eyes. As another example, in some scenarios (e.g., military, hunting, law-enforcement), it may be desirable to control the emission of illumination light to reduce or eliminate the chance that it may be visible to other parties—e.g., to maintain a covert presence.

Accordingly, the present disclosure is directed to techniques for controlling emission of illumination light by an illumination light source. This may be done in a manner that reduces the visibility of the illumination light to potential observers in the environment. Specifically, according to the techniques described herein, a computing system controlling an illumination light source defines a light restriction zone relative to the external environment. The light restriction zone may, as one example, include at least a portion of the environment about a horizon line. As another example, the light restriction zone may be determined based at least in part on a known topography of the external environment. Regardless, based at least in part on an orientation of the illumination light source, the computing system controls the illumination light source to direct the illumination light toward at least a portion of the external environment outside the light restriction zone, without emitting the illumination light into the light restriction zone.

The present disclosure primarily focuses on preventing direct emission of illumination light from an illumination light source into a light restriction zone. It will be understood that this need not prevent 100% of all illumination light from entering the light restriction zone. For example, as an orientation and/or position of the light source changes, some illumination light may be emitted into the light restriction zone before the light restriction zone is updated. As another example, at least some illumination light emitted by the illumination light source may reflect off an object in the external environment and ultimately enter the light restriction zone. Thus, it will be understood that the computing system may mitigate at least some emission of the illumination light into the light restriction zone, even if a portion of the emitted illumination light is visible within the light restriction zone at different points in time.

In this manner, the techniques described herein may beneficially enable effective illumination of an environment (e.g., enabling a user of the computing device to more clearly see the environment), while reducing the visibility of the illumination light to potential observers. The techniques described herein may provide a technical benefit of reducing consumption of computing resources—e.g., reducing consumption of electrical power to conserve battery life. This may be done by selectively controlling emission of illumination light to reduce the amount of light entering a defined restriction zone, and/or more efficiently using illumination light for portions of the environment determined to have relatively higher importance. As another example, the techniques described herein may provide a technical benefit of reducing the burden of user input to a computing device—e.g., by reducing the manual effort required by a user to effectively illuminate their surrounding environment while maintaining a covert presence.

FIG. 1 schematically shows a user 100 using an example computing system 102 in an environment 104. In this example, the computing system is implemented in a wearable assembly configured to be worn on the head of user 100. However, it will be understood that this is non-limiting. In general, the techniques described herein may be implemented by a computing system of one or more computing devices, configured to control emission of illumination light by an illumination light source. The one or more computing devices may each have any suitable capabilities, hardware configuration, and form factor.

More particularly, any or all of the techniques described herein may be performed by a logic machine of a computing system. In some cases, the logic machine may be integrated into a same housing as the illumination light source—e.g., the entire computing system may take the form of a portable device that can be carried or worn by the user. In other cases, components of the computing system may be distributed between multiple separate devices. For example, the logic machine may be physically separate from the illumination light source, although may still control operation of the illumination light source via a suitable wired or wireless connection. In some cases, the computing system may be implemented as computing system 1000 described below with respect to FIG. 10.

In FIG. 1, computing system 100 includes an illumination light source that emits illumination light 106 into the external environment. The illumination light is represented in FIG. 1 by a dashed circle extending away from computing system 102. It will be understood that the size and shape of the projected illumination light in FIG. 1 is non-limiting. In other examples, the profile of the illumination light emitted by an illumination light source may have any suitable size and shape—e.g., if projected onto a flat surface perpendicular to the travel direction of the illumination light, the illumination light may form any suitable shape depending on the specific design of the illumination light source. Furthermore, the illumination light may illuminate any suitable portion of the external environment. In other words, as compared to FIG. 1, the illumination light may illuminate a smaller area (e.g., the illumination light may be more tightly focused, and/or the illumination light source may emit less total light), or a larger area (e.g., the illumination light may be more tightly focused, and/or the illumination light source may emit more total light).

Furthermore, in some cases, the computing system may include two or more illumination light sources, configured to emit illumination light toward the same or different portions of the external environment. In such cases, each of the two or more illumination light sources may be independently controllable to mitigate emission of light into one or more different light restriction zones. Furthermore, the two or more illumination light sources may in some cases be controllable to emit overlapping illumination light into the external environment—e.g., to intensify the illumination strength in selected areas.

It will be understood that the illumination light emitted into the external environment may have any suitable properties. For instance, the illumination light may include visible wavelengths of light—e.g., the illumination light source may take the form of a flashlight, spotlight, personal headlamp, vehicle headlight, and/or any other suitable source of visible illumination light. Additionally, or alternatively, the illumination light may include infrared wavelengths of light—e.g., the illumination light source may be a component of an active night vision system configured to image a dark environment using an infrared camera. In some circumstances, the wavelength(s) of illumination light emitted by the illumination light source may be matched to the light sensor used in the imaging system to reduce detectability by external sensors.

Furthermore, the illumination light may be emitted with any suitable intensity. In some cases, the intensity of the illumination light may be variable over time—e.g., the illumination light source may be controllable by the computing system to dynamically increase or decrease the intensity of the illumination light. Additionally, or alternatively, the intensity of the illumination light may be spatially variable—e.g., the illumination light source may be controllable by the computing system to dynamically increase the intensity of illumination light directed at portions of the external environment, and/or decrease the intensity of illumination light directed at other portions of the environment.

Regardless, in the example of FIG. 1, the illumination light is emitted into external environment 104 such that, from the perspective of the illumination light source, at least some of the illumination light goes over the horizon line. As such, the illumination light may be visible and/or otherwise detectable by an observer that is relatively distant from user 100. In some cases, the illumination light may be visible or otherwise detectable to observers that user 100 is unaware of. This may be undesirable as described above—e.g., user 100 may intend for their position within environment 104 to remain undetected.

Figure 2:
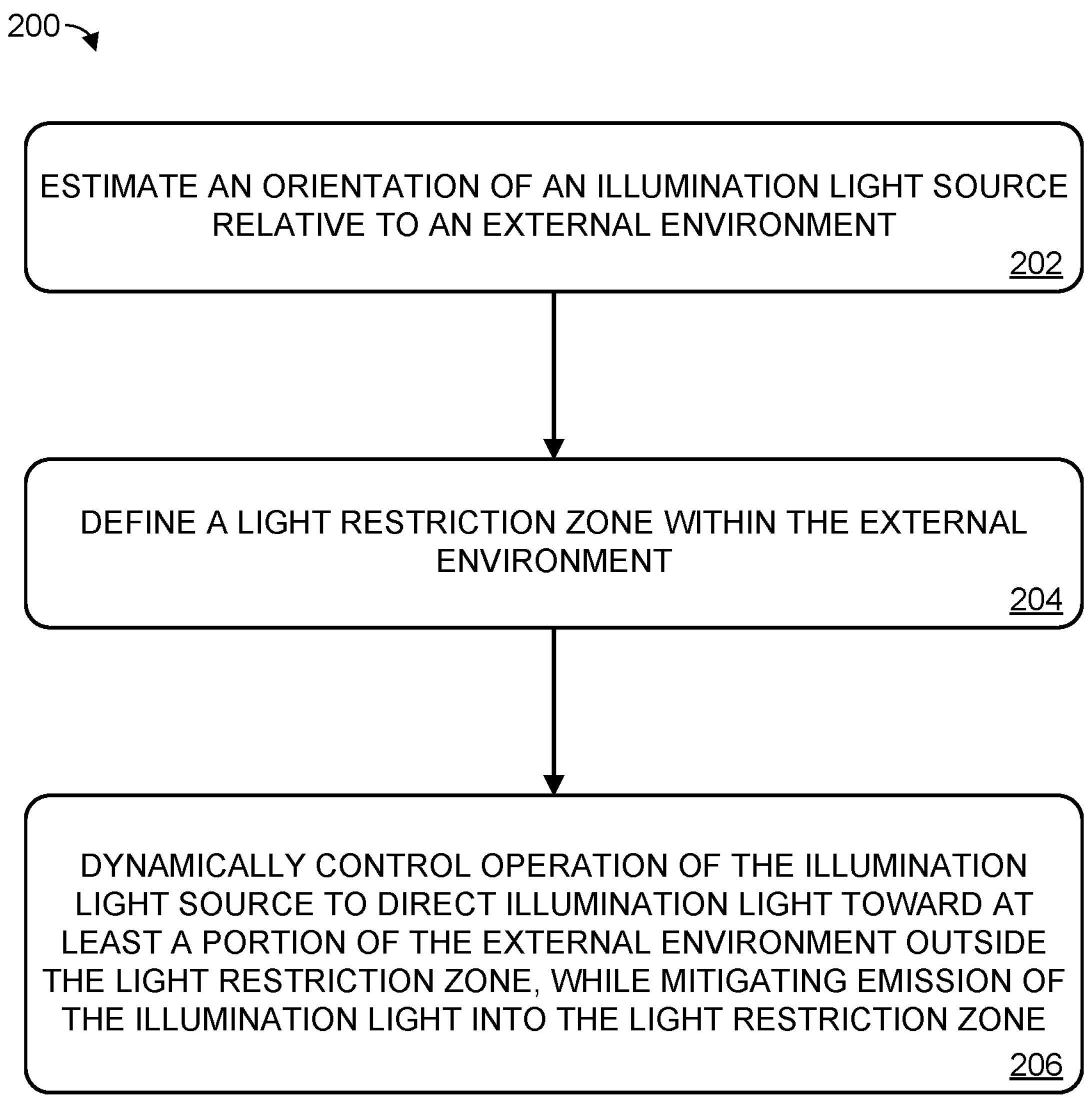
FIG. 2 illustrates an example method for illumination light restriction.

As such, FIG. 2 illustrates an example method 200 for illumination light restriction. Method 200 may be implemented by a computing system of one or more computing devices. Any computing devices implementing method 200 may have any suitable capabilities, hardware configuration, and form factor. As one example, method 200 may be implemented by computing system 102 of FIG. 1. As another example, method 200 may be implemented by computing system 1000 described below with respect to FIG. 10. In general, method 200 is performed by a computing system that is configured to control an illumination light source that emits illumination light into an external environment, as discussed above.

At 202, method 200 includes estimating an orientation of the illumination light source relative to the external environment. The present disclosure primarily describes the orientation of the illumination light source as being estimated by an orientation sensor of the computing system. This may include the orientation sensor itself estimating an orientation of the illumination light source via suitable computer logic integrated into the orientation sensor, and reporting the orientation estimate (e.g., as one or more angular values) to a logic machine of the computing system that performs other computing functions described herein. Additionally, or alternatively, the orientation sensor may report raw measurement data to the logic machine, which may be used by the logic machine to estimate the orientation. In either case, the orientation of the illumination light source is referred to herein as being estimated by the orientation sensor.

The orientation sensor may take any suitable form, and in some cases may refer to a combination of two or more different sensors. As non-limiting examples, the orientation sensor may include an accelerometer, gyroscope, and/or magnetometer. In some examples, the orientation sensor may be implemented as an inertial measurement unit (IMU). As one non-limiting example, the sensor may take the form of an optical imaging sensor that can be used to help determine the intensity of the illumination light radiated by the illumination light source.

The orientation of the illumination light source may be specified with any suitable precision. In some examples, the orientation of the illumination light source may be reported with two degrees-of-freedom (2-DOF). For example, the orientation sensor may include an accelerometer configured to estimate a gravity vector within the external environment, and the orientation of the illumination light source may be reported relative to the gravity vector—e.g., the orientation may include an estimated pitch angle and roll angle relative to two directional axes (e.g., X and Z axes) perpendicular to the gravity vector. In some cases, the orientation may be reported as a 3-DOF measurement, including estimated angles for pitch, roll, and yaw (e.g., angles relative to the X, Y, and Z axes). For example, the computing system may include a magnetometer configured to estimate a bearing of the illumination light source—e.g., relative to magnetic north, and the yaw of the illumination light source may be estimated relative to magnetic north.

In some examples, the orientation sensor may further be configured to estimate a position of the illumination light source. Additionally, or alternatively, the computing system may include one or more sensors other than the orientation sensor configured to estimate a position of the illumination light source. For example, the computing system may include a global positioning system (GPS) sensor configured to detect a geographical position of the illumination light source.

Figure 3:
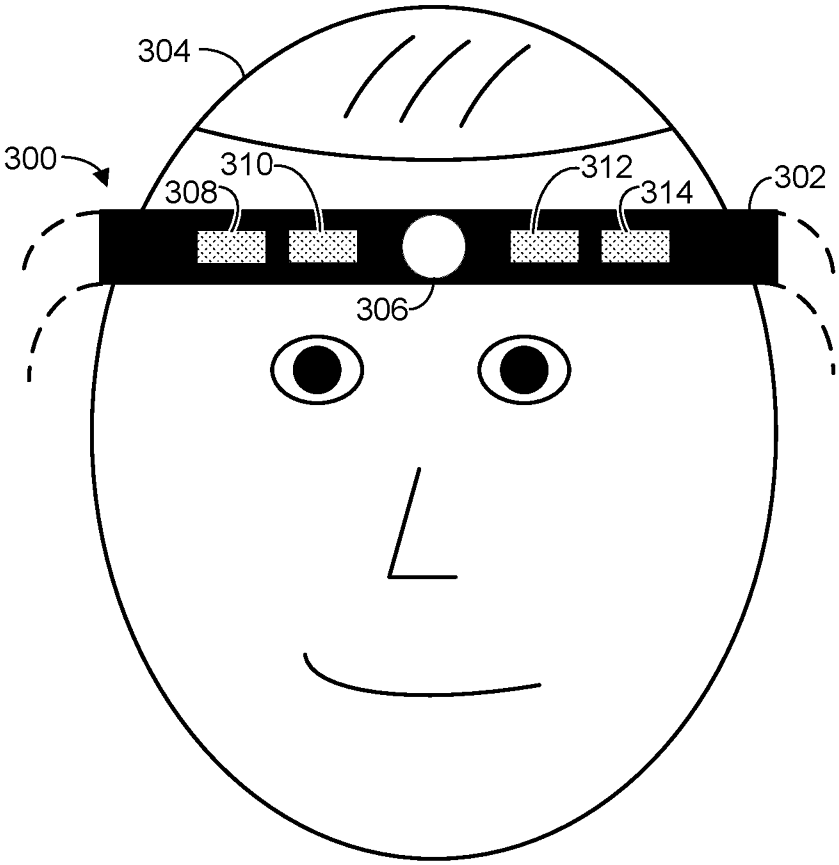
FIG. 3 schematically illustrates an example computing system including an illumination light source integrated into a wearable assembly.

In general, any orientation/position sensors of the computing system will typically be physically disposed such that a change in orientation/position of the illumination light source is detectable by the applicable sensors. For example, FIG. 3 schematically illustrates another example computing system 300. As with computing system 102 of FIG. 1, computing system 300 is integrated into a wearable assembly 302, worn on a head 304 of a human user. It will be understood that computing system 300 is non-limiting and highly simplified for the sake of example. The techniques described herein may be implemented by computing systems having different capabilities, form factors, and hardware configurations from computing system 300.

Computing system 300 includes an illumination light source 306, configured to emit illumination light into an external environment. As discussed above, the illumination light may include any suitable wavelengths of light, and may be emitted with any suitable spatial distribution relative to the external environment. Furthermore, in the example of FIG. 3, the illumination light source is also integrated into wearable assembly 302 configured to be worn on the head 304 of the human user. Thus, in this example, the computing system has a similar form factor to a personal headlamp.

Computing system 300 includes an orientation sensor 308 integrated into the wearable assembly. As discussed above, the orientation sensor may take any suitable form, and may in some cases include multiple different sensors acting cooperatively. Computing system 300 further includes a position sensor 310 integrated into the wearable assembly. Thus, in this example, a logic machine 312 of the computing system may receive an estimated orientation and/or position of the illumination light source relative to the external environment, or the logic machine may be configured to estimate the orientation/position based on data reported by the orientation and position sensors, as discussed above. Because the orientation sensor and position sensor are integrated into the same wearable assembly as the illumination light source, any changes in the position and/or orientation of the illumination light source may be detected by the corresponding sensors.

It will be understood that a computing system as described herein need not include both an orientation sensor and a position sensor. Rather, as discussed above, a computing system may in some cases omit a position sensor. For instance, a computing system may only include an orientation sensor, which may report a 2-DOF estimated orientation of the illumination light source relative to a gravity vector.

In the example of FIG. 3, the illumination light source, orientation sensor, position sensor, and logic machine are all integrated into the wearable assembly. It will be understood that this is not limiting. For example, the logic machine may be implemented via one or more computing devices separate from wearable assembly 302—e.g., communicatively coupled with the illumination light source, orientation sensor, and position sensor via a suitable wired or wireless connection.

In FIG. 3, the computing system further includes a camera 314 configured to image the external environment. The camera may take any suitable form. Specifically, the camera may include an image sensor that is sensitive to any suitable wavelengths of light (e.g., visible light, infrared light), and any suitable optics for focusing light from the external environment onto the image sensor. Logic machine 312 may receive images captured by camera 314. As will be described in more detail below, images from a camera may in some cases be used to define a light restriction zone.

Figure 4A:
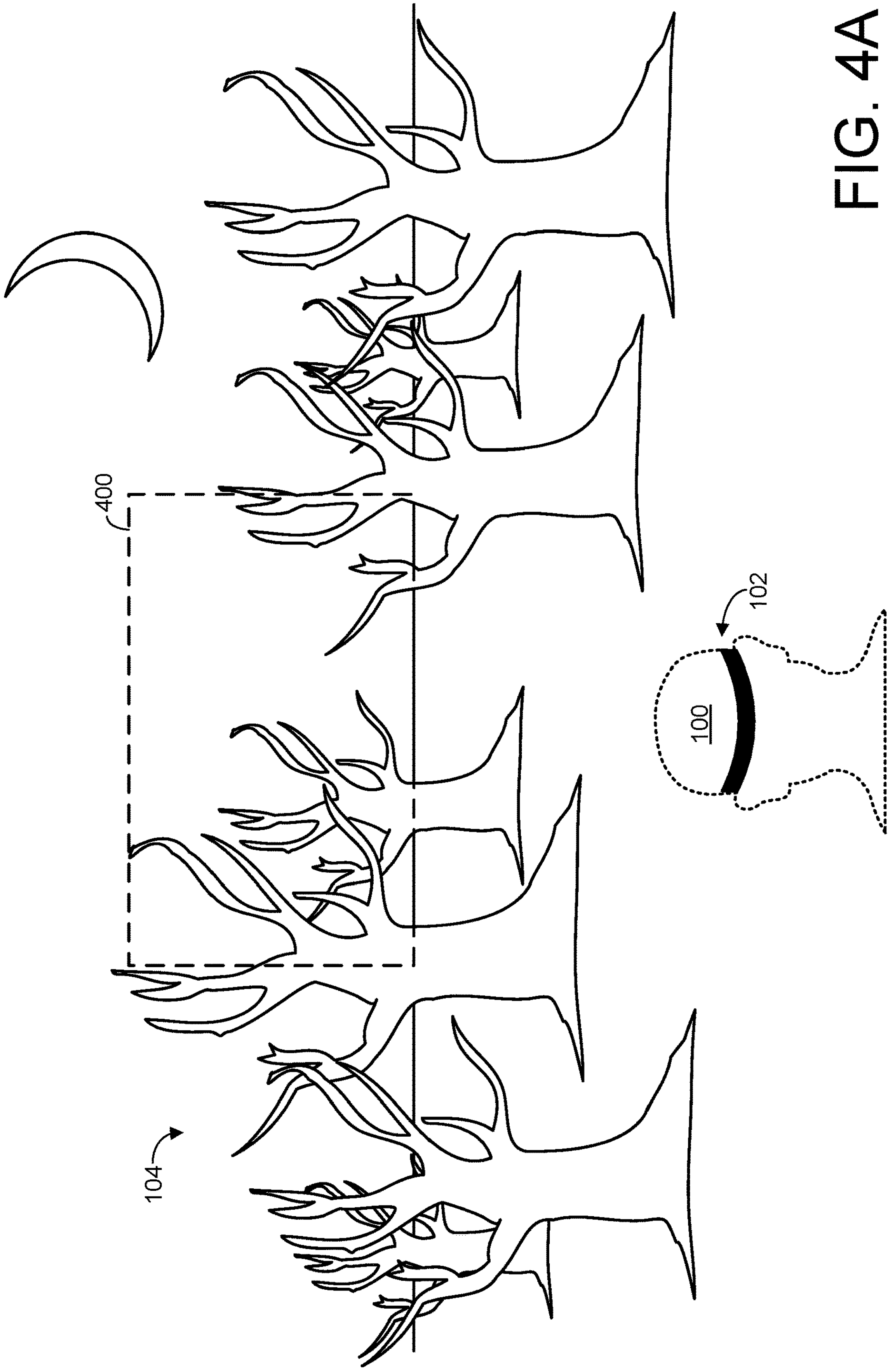
FIGS. 4A and 4B schematically illustrate defining a light restriction zone within an external environment.

Returning briefly to FIG. 2, at 204, method 200 includes defining a light restriction zone within the external environment. This is schematically illustrated with respect to FIG. 4A, which again shows user 100 in environment 104. In FIG. 4A, computing system 102 has defined a light restriction zone 400 within the external environment. The light restriction zone may be defined in any suitable way and include any suitable portion of the external environment.

In some examples, the light restriction zone may be defined as a two dimensional area, where the illumination light source is controlled to mitigate emission of illumination light through the two-dimensional area—e.g., the light restriction zone may be akin to a window through which illumination light should not be emitted. As another example, the light restriction zone may be defined as a three-dimensional area within the external environment, where the illumination light source is controlled to mitigate emission of illumination light into the three-dimensional area. In any case, the light restriction zone may be defined relative to the range of possible angles at which the illumination light source is capable of emitting illumination light. For example, based at least on the current orientation of the illumination light source, the logic machine may determine that a subset of the angles at which the illumination light source is capable of emitting illumination light would cause the illumination light to enter the light restriction zone. Thus, the logic machine may designate that subset of angles as being restricted. As the orientation (and/or position) of the illumination light source changes, and/or as the light restriction zone is redefined, the logic machine may modify the restricted subset of emission angles.

In the example of FIG. 4A, the light restriction zone includes a portion of environment 104 that lies above a horizon line. For instance, by controlling the illumination light source to mitigate emission of illumination light into light restriction zone 400, the computing device may reduce or prevent visibility of the illumination light to potential observers relatively distant from user 100, including any observers that user 100 may be unaware of. In another example, the light restriction zone may be defined to include substantially all of the external environment above the horizon line from the perspective of the illumination light source.

In cases where the light restriction zone is defined based on the horizon line, the position of the horizon line may be detected in any suitable way. As one example, the logic machine may assume that the position of the illumination light source is at or near ground level, and that the landscape of the external environment is substantially flat (e.g., no hills or valleys). Thus, the horizon will form a circle surrounding the illumination light source in every direction, and a plane extending through the illumination light source and horizon will have approximately a 90° angle relative to the gravity vector. As such, the logic machine may define restrict emission of illumination light at any angles greater than or equal to 90° relative to the gravity vector, to mitigate direct emission of the illumination light over the horizon line. As another example, the logic machine may restrict emission of illumination light at angles less than 90° (e.g., angles greater than or equal to 70° may be restricted) to further reduce the distance at which the illumination light may be visible from the illumination light source.

In this example, because the horizon forms a circle that surrounds the illumination light source, the light restriction zone is not sensitive to the yaw angle of the illumination light source—e.g., the rotation of the illumination light source about the gravity vector. Thus, as discussed above, the orientation of the illumination light source estimated by the orientation sensor may in some cases be a 2-DOF orientation estimate including pitch and roll angles.

Additionally, or alternatively, the logic machine may detect the horizon line based at least in part on an image captured by a camera—e.g., camera 314 of FIG. 3. This may be useful in scenarios where objects and/or terrain features (e.g., buildings, trees, hills, mountains) are disposed between the illumination light source and the theoretical position of the horizon. Thus, the illumination light source may be defined above the horizon line for yaw angles at which the horizon line would be visible (e.g., there is an unimpeded path between the illumination light source and the horizon visible in a captured image), and defined in other ways for other yaw angles—e.g., those for which the horizon is occluded by a building or hillside. Notably, in this case, some yaw angles may be unrestricted—e.g., for some range of yaw angles, any emitted illumination light would reach an object such as a wall, preventing the light from reaching distant potential observers.

As another example, the light restriction zone may be defined based at least in part on the relationship between the illumination light source and the computing system. In some cases, the illumination light source may be rigidly connected to the computing system—e.g., the illumination light source may be integrated into a wearable housing of a head-mounted display device (HMD). In such cases, the restriction zone may be defined as any areas of the external environment outside a field-of-view of an imaging sensor provided to the HMD. In some cases, the light restriction zone may include some portions of the external environment within the field-of-view of the imaging sensor.

Additionally, or alternatively, the computing system may in some cases be used with an illumination light source that is separate from the computing system. In such cases, the light restriction zone may be defined such that only portions of the external environment viewed by the HMD are illuminated—e.g., in a scenario where the illumination light source is pointed in a different direction from the gaze vector of the HMD, any angles of illumination light that do not overlap with a field-of-view of the HMD may be restricted.

As another example, the light restriction zone may be defined based at least in part on a known topography of the external environment surrounding the illumination light source. For example, the logic machine may estimate a position of the illumination light source relative to a topographical model of the external environment. The light restriction zone may then be defined based at least in part on the estimated position of the illumination light source relative to the topographical model.

Figure 5A:
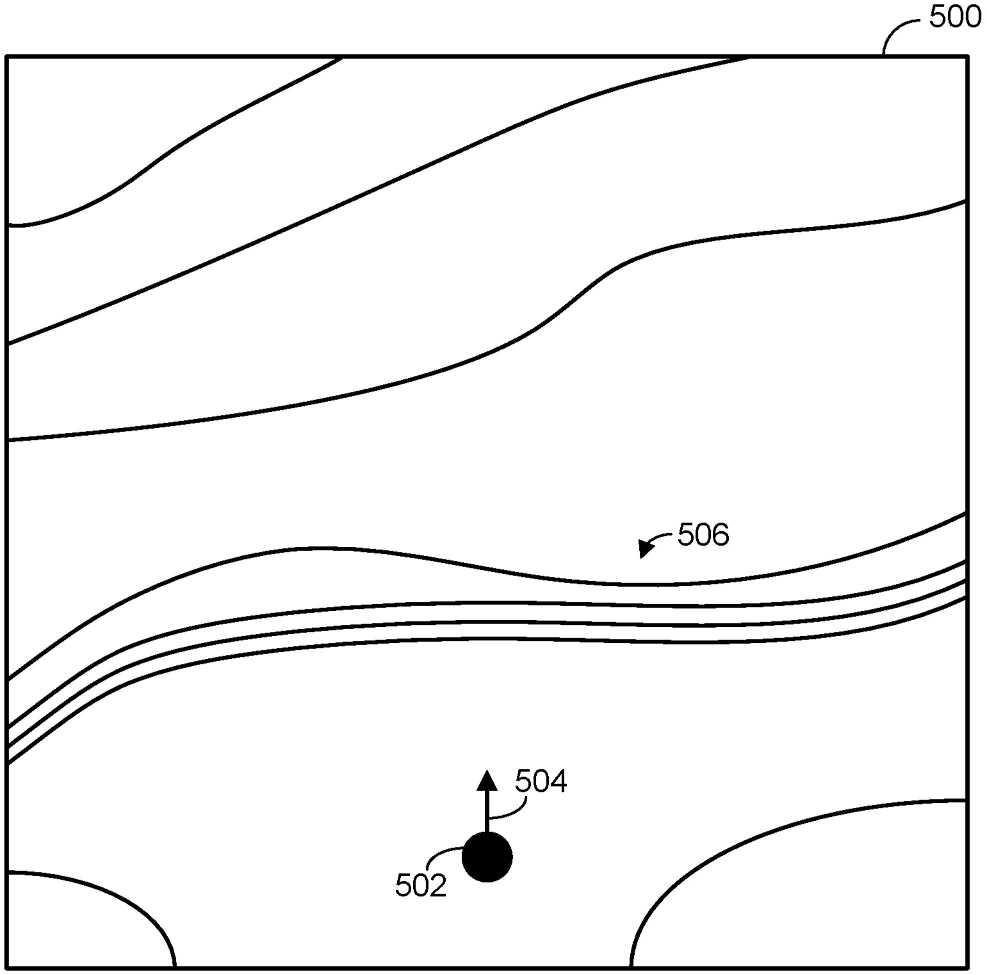
FIGS. 5A, 5B, and 5C schematically illustrate defining a light restriction zone based at least in part on a topographical model of an external environment.

This is schematically illustrated with respect to FIG. 5A. Specifically, FIG. 5A schematically represents an example topographical model 500 corresponding to an environment. In this example, topographical model 500 is presented as a topographical map, in which the curved lines represent changes in elevation caused by underlying topography (e.g., hills, slopes, cliffs). However, it will be understood that this is only done for the sake of illustration. The specific appearance of topographical model 500 in FIG. 5A is non-limiting. Furthermore, it will be understood that a "topographical model" need not graphically be rendered or displayed at all—rather, the topographical model may take the form of any suitable computer data structure that includes information regarding the topography of the external environment, without being displayed for human viewing. As one example, the topographical model may be a three-dimensional mesh model—e.g., generated via suitable terrain mapping techniques.

The topographical model may have any suitable source. In some examples, the topographical model may be a preexisting model—e.g., stored by a storage subsystem of the computing system, and/or retrieved from a remote database (e.g., over the Internet). As another example, the topographical model may be generated on-the-fly by the computing system. For example, the computing system may store and/or access a predefined topographical map (e.g., a two-dimensional map of the environment that indicates relative differences in elevation), and derive a three-dimensional topographical model from the topographical map. As another example, the computing system may capture one or more images of the external environment via one or more cameras (e.g., camera 314 in FIG. 3), and derive a topographical model based at least in part on the captured images via suitable computer vision techniques. For example, if multiple images are captured from multiple different positions as the camera moves within the environment, the computing system may estimate the approximate distances of different terrain features away from the camera viewpoint based on the relative changes in the image-space positions at which the feature are visible.

In any case, the computing system may estimate a position of the illumination light source relative to the topographical model. This is schematically illustrated in FIG. 5A, showing the estimated position 502 of the illumination light source relative to topographical model 500. The position of the illumination light source may be estimated in any suitable way. As one example, the position of the illumination light source may be estimated relative to the topographical model based at least in part on a geographical position of the illumination light source detected by a GPS sensor—e.g., position sensor 310 of FIG. 3. The computing system may maintain a mapping between world-space geographical positions and model-space positions relative to the topographical model, and convert the estimated geographical position of the illumination light source into an estimated position relative to the topographical model—e.g., position 502 in FIG. 5A.

In cases where a topographical model is used in defining the light restriction zone, the light restriction zone may further be defined based at least in part on an estimated bearing of the illumination light source. The bearing of the illumination light source may be estimated in any suitable way—e.g., via a magnetometer configured to determine the direction of magnetic north, as discussed above. In FIG. 5A, the logic machine has estimated a bearing 504 of the illumination light source relative to the external environment, represented as an arrow extending away from position 502. As shown, the illumination light source is directed toward a topographical feature consistent with a significant change in elevation—e.g., a steep slope or cliff.

Figure 5B:
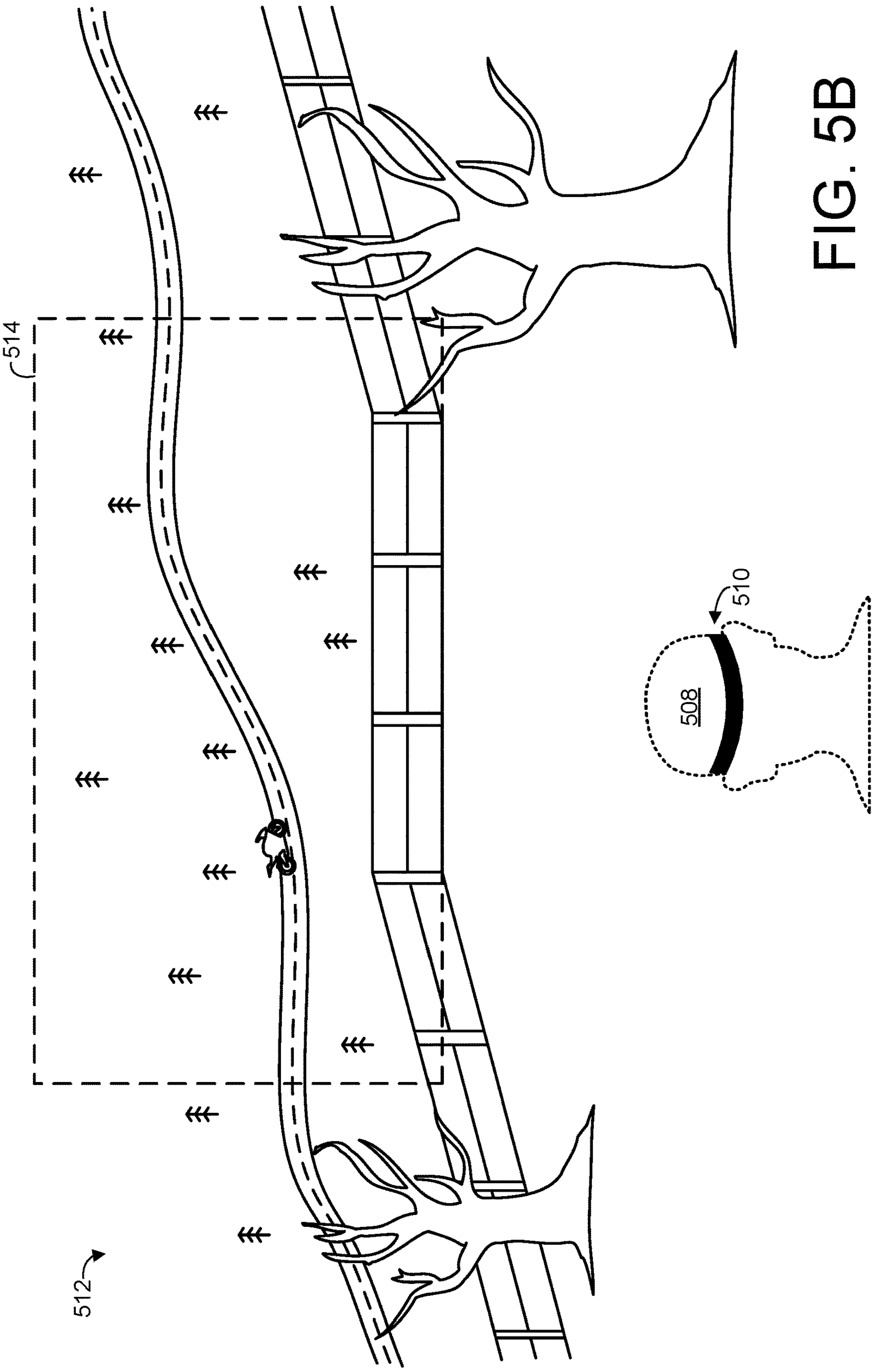

FIG. 5B schematically illustrates an example scenario that is generally consistent with the topographical model of FIG. 5A. Specifically, FIG. 5B shows a user 508 with a computing system 510 in an environment 512. It will be understood that topographical model 500 and environment 512 are provided for illustration purposes only, and that topographical model 500 is not intended to be an exact or precise representation of environment 512. Regardless, in environment 512, user 508 is facing toward a cliff overlooking a distant landscape and highway, consistent with the steep topographical feature toward which the bearing 504 of the illumination light source is pointed in FIG. 5A.

In the example of FIG. 4A, the landscape of the external environment is substantially flat. Thus, by constraining the range of angles at which illumination light can be emitted to angles less than 90°, the computing system can ensure that the illumination light strikes the ground rather than continues to the horizon, thereby reducing the distance from which the illumination light can be detected by potential observers. In FIG. 5B, the illumination light source is directed toward a steep downward slope, and thus the distance between the illumination light source and the horizon can potentially be much greater than would be the case for a substantially flat landscape.

Thus, based at least in part on the topographical model, and the estimated position and orientation of the illumination light source, computing system 510 has defined a light restriction zone 514 relative to external environment 512. Unlike in FIG. 4A, in this example, the light restriction zone includes portions of the environment below the horizon line. In particular, the restriction zone is defined to exclude portions of the environment beyond the downward slope that the illumination light source is facing toward. In other words, the light restriction zone is defined to reduce visibility of the illumination light from more than a threshold distance away from the illumination light source, where any suitable threshold may be used depending on the implementation. For example, if the logic machine determines that a particular emission angle for illumination light will cause the illumination light to travel greater than the threshold distance before reaching a topographical feature (or the horizon line), then that emission angle may be restricted. By contrast, if the logic machine determines that a different emission angle will cause the illumination light to strike a topographical feature (e.g., flat ground or an upward slope) that is less than the threshold distance away, then that angle may be unrestricted.

It will be understood that use of a distance threshold in defining a light restriction zone may be used regardless of whether the computing system has access to a topographical model of the external environment. For example, even in a case where the external environment is assumed to have a substantially flat landscape, the logic machine may define the light restriction zone to reduce visibility of illumination light from more than the threshold distance away—e.g., by restricting emission angles such that the illumination light will strike the ground much closer to the position of the illumination light source than the horizon.

Returning briefly to FIG. 2, at 206, method 200 includes, based at least in part on the orientation of the illumination light source, dynamically controlling the illumination light source to direct the illumination light toward at least a portion of the external environment outside the light restriction zone. Furthermore, the illumination light source is controlled to mitigate emission of the illumination light into the light restriction zone.

Figure 4B:
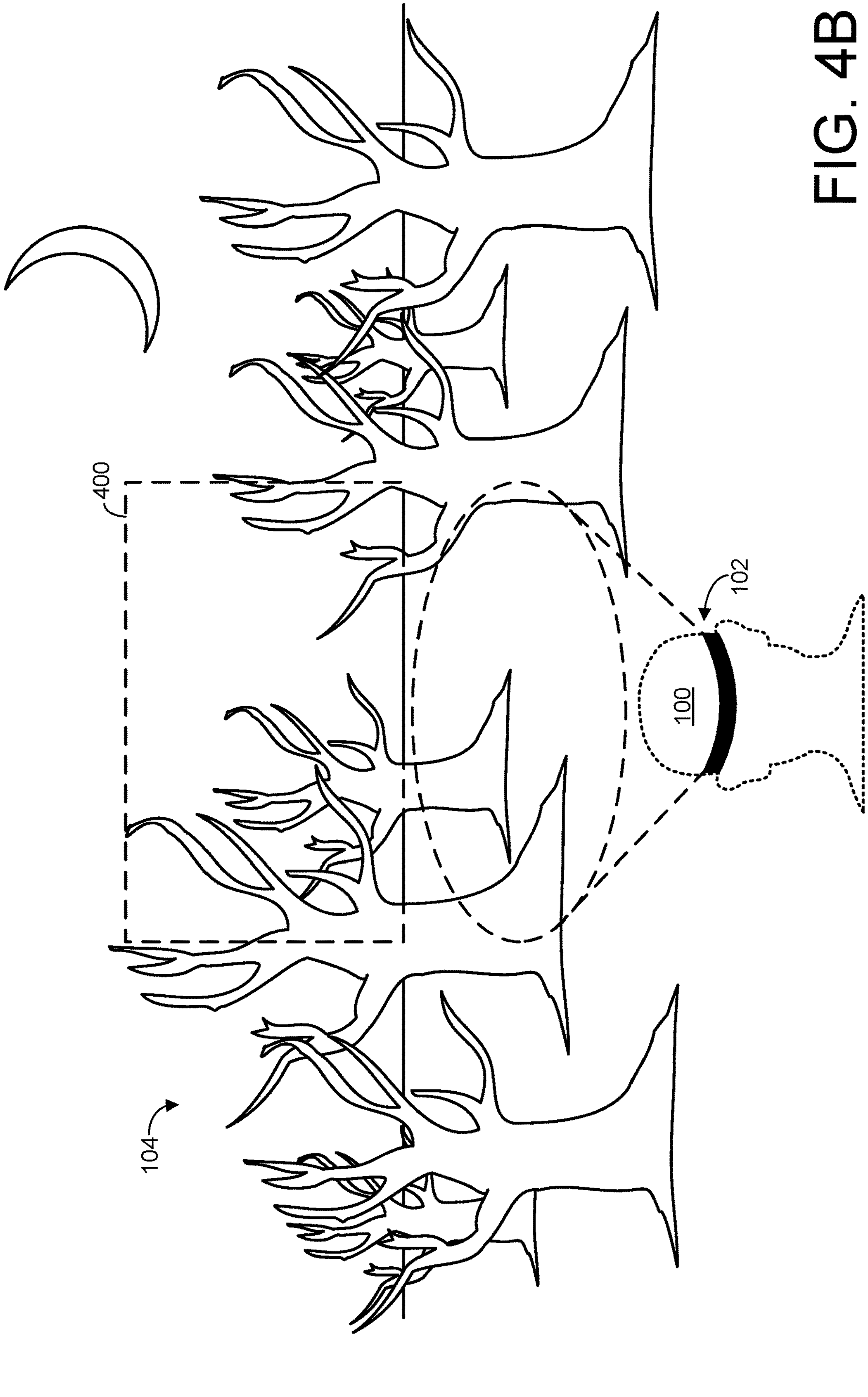

This is schematically illustrated with respect to FIG. 4B, again showing user 100 in environment 104. In this example, computing system 102 is controlling the illumination light source to direct illumination light 106 toward a portion of external environment 104 outside light restriction zone 400. Furthermore, the illumination light source is controlled to mitigate emission of illumination light into the light restriction zone. In this manner, the computing system potentially reduces the visibility of the illumination light to other potential observers in environment 104.

Figure 5C:
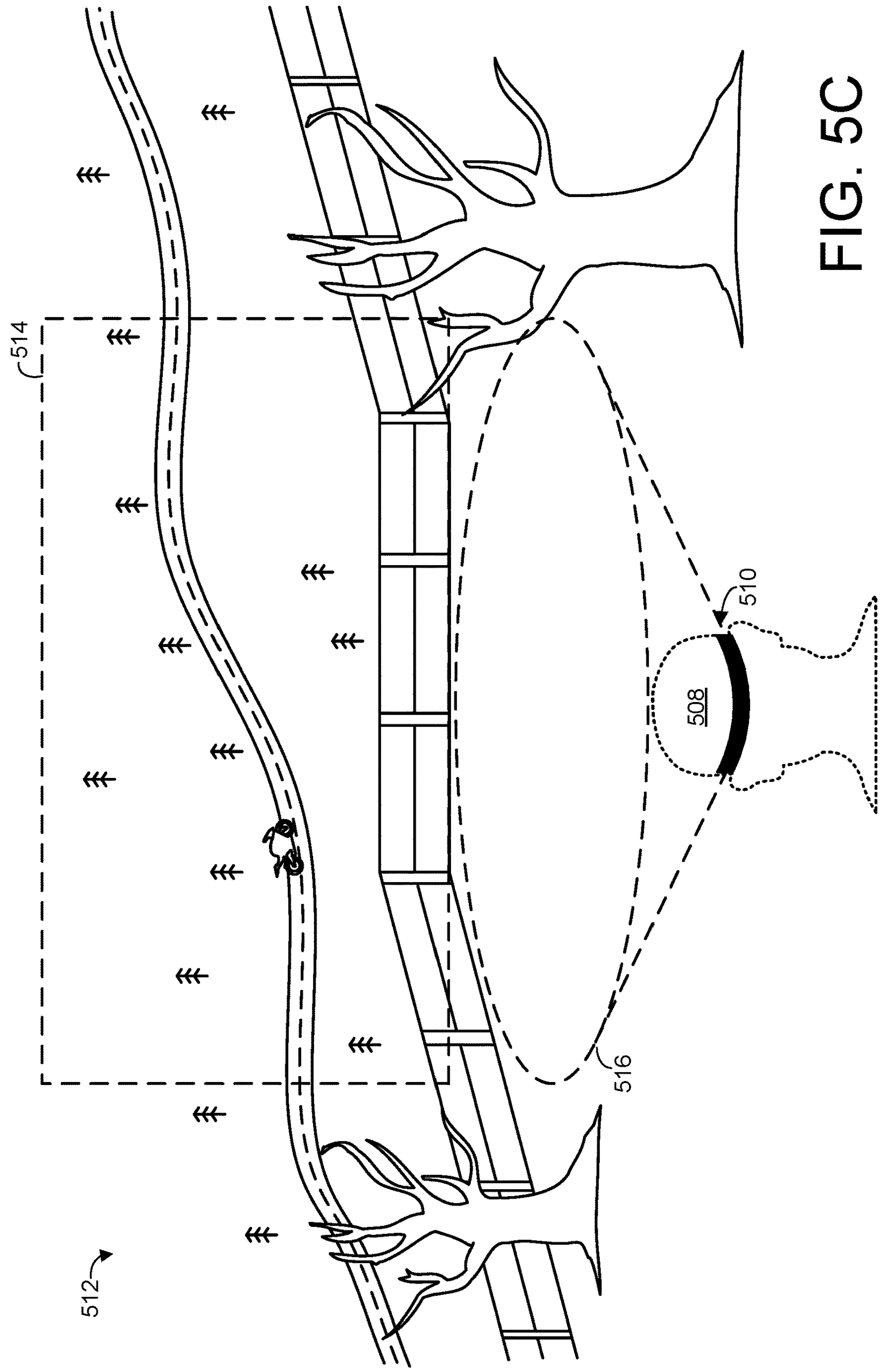

This is also schematically illustrated with respect to FIG. 5C, again showing user 508 in environment 512. In this example, computing system 510 is controlling the illumination light to direct illumination light 516 toward a portion of external environment 512 outside light restriction zone 400. Furthermore, the illumination light source is controlled to mitigate emission of illumination light into the light restriction zone. Again, this may have the effect of reducing or preventing visibility of the illumination light to potential observers in environment 512—e.g., having positions below the slope that user 508 is facing toward.

The illumination light source may be controlled in any suitable way, depending on the specific configuration of the illumination light source. Various non-limiting examples will be described with respect to FIGS. 6A-B, 7A-B, and 8A-B. It will be understood that each of these FIGS. are highly simplified and provided only for the sake of illustration. In general, a computing system may use any suitable illumination light source to emit illumination light, and such a light source may be controlled in any suitable way.

Figure 6B:
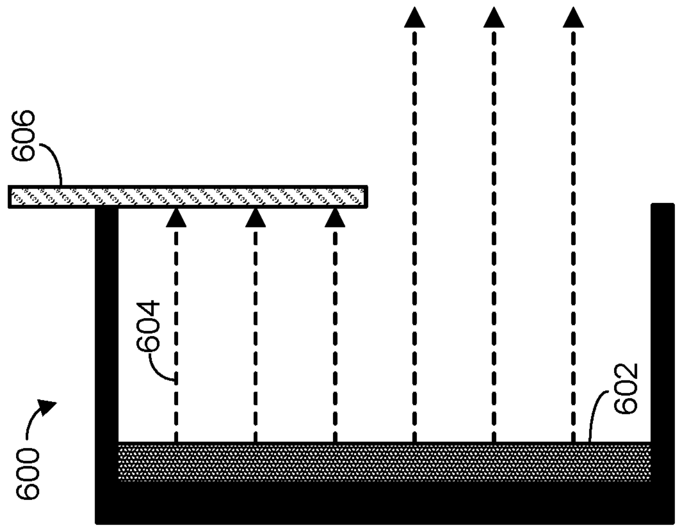
FIGS. 6A and 6B schematically illustrate controlling an example illumination light source.
Figure 6A:
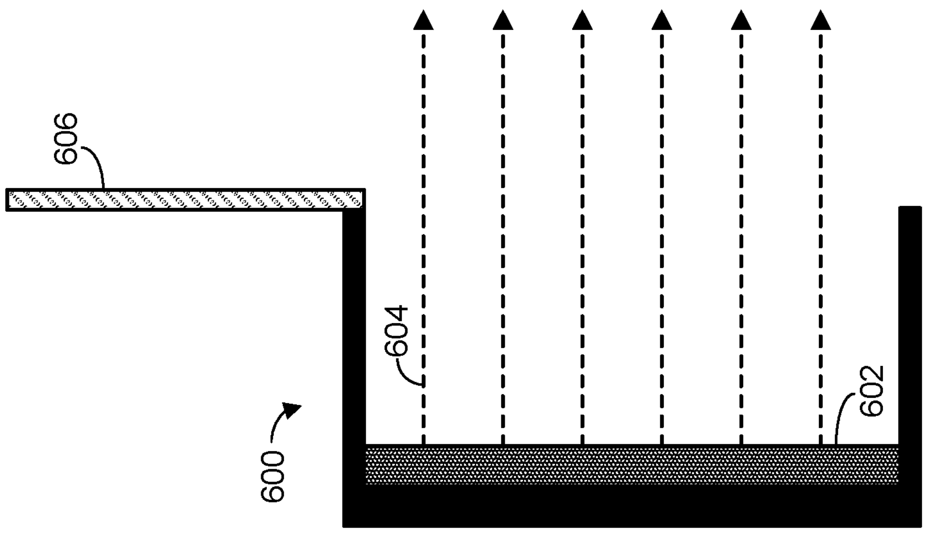

FIG. 6A schematically shows an example illumination light source 600, including a light emitter 602 that is emitting illumination light 604 toward an external environment, where the illumination light is represented as several dashed arrows extending away from the light emitter. The light emitter may take any suitable form, using any suitable technology for emitting illumination light toward an external environment.

Furthermore, in FIG. 6A, illumination light source 600 includes a controllable shutter 606. It will be understood that shutter 606 is non-limiting, and is intended only to illustrate the general concept of using a shutter to control emission of illumination light. In general, a "controllable shutter" as described herein can take the form of any suitable mechanism that is controllable by a logic machine to block or occlude at least a portion of the illumination light emitted by the illumination light source. Thus, in some cases, controlling the illumination light source to mitigate emission of the illumination light into the light restriction zone may include controlling the controllable shutter to block emission of the illumination light into the light restriction zone.

This is schematically illustrated in FIG. 6B. As shown, controllable shutter 606 has been controlled by the logic machine such that it is now blocking a portion of the illumination light 604 emitted by the light emitter 602. For example, the logic machine may control the controllable shutter to block a portion of the illumination light predicted to enter a defined light restriction zone, such as restriction zone 400 in FIG. 4B, or restriction zone 514 in FIG. 5C.

Figure 7A:
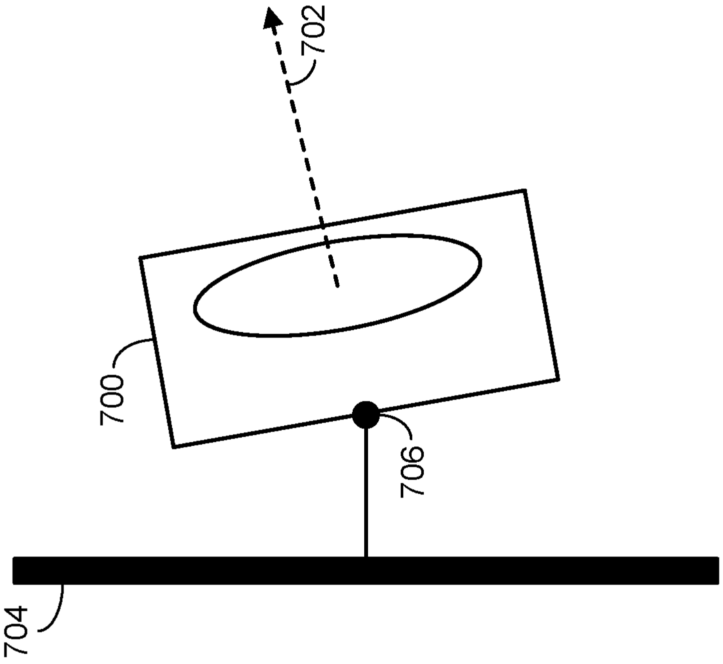
FIGS. 7A and 7B schematically illustrate controlling another example illumination light source.

FIG. 7A schematically shows another example illumination light source 700, emitting illumination light 702 toward an external environment. In this example, the illumination light source is coupled to a computing system 704, and includes a controllable gimbal 706 useable to change the orientation of the illumination light source relative to the computing system. In other words, while the computing system remains stationary, the illumination light source may be aimed via gimbal 706 to change the angle at which illumination light 702 is emitted into the external environment. Thus, in some examples, controlling the illumination light source to mitigate emission of the illumination light into the light restriction zone may include controlling the controllable gimbal to aim the illumination light away from the light restriction zone.

Figure 7B:
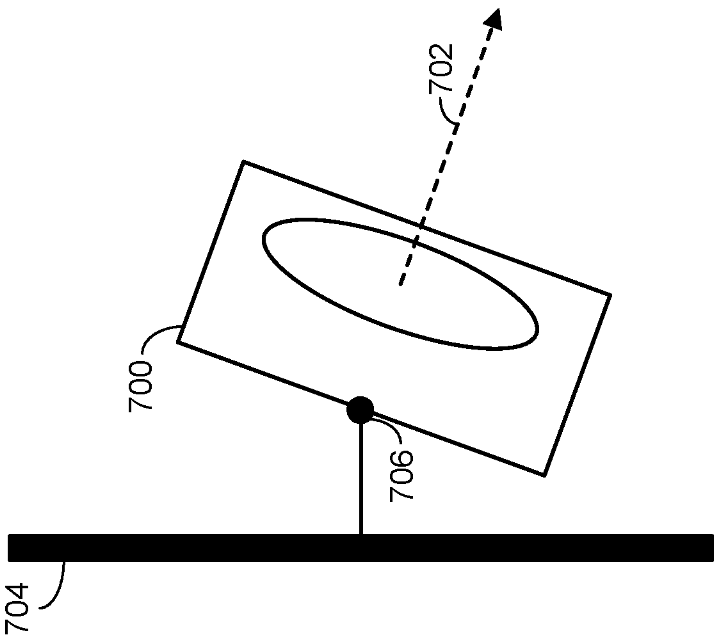

Again, it will be understood that FIGS. 7A and 7B are highly simplified and provided only to illustrate the general concept of using a controllable gimbal to affect the angle at which illumination light is emitted. In other implementations, a "controllable gimbal" may be used in any variety of suitable configurations that differ from those shown in FIGS. 7A and 7B.

This is schematically illustrated in FIG. 7B. As shown, the logic machine has controlled the illumination light source to change the angle at which illumination light 702 is emitted via controllable gimbal 706. Thus, for example, the logic machine may control the controllable gimbal to mitigate emission of illumination light into a light restriction zone, as discussed above.

Figure 8B:
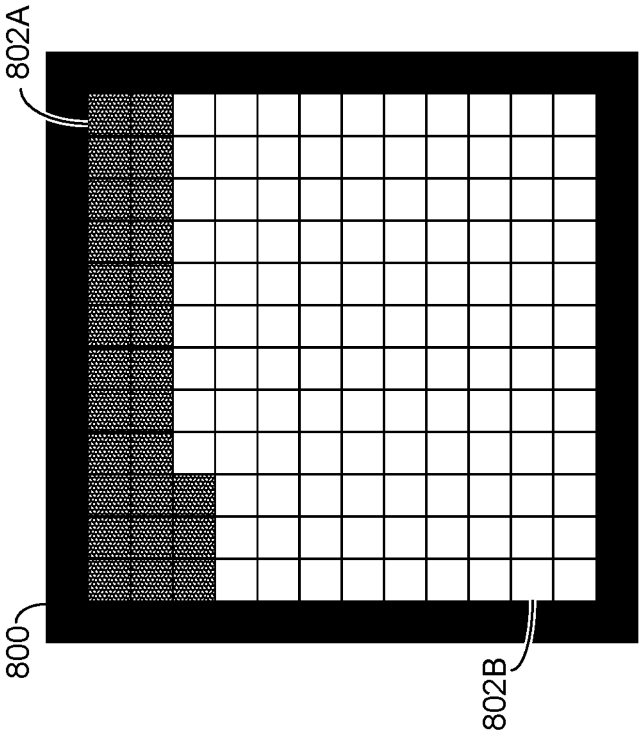
FIGS. 8A and 8B schematically illustrate controlling another example illumination light source.
Figure 8A:
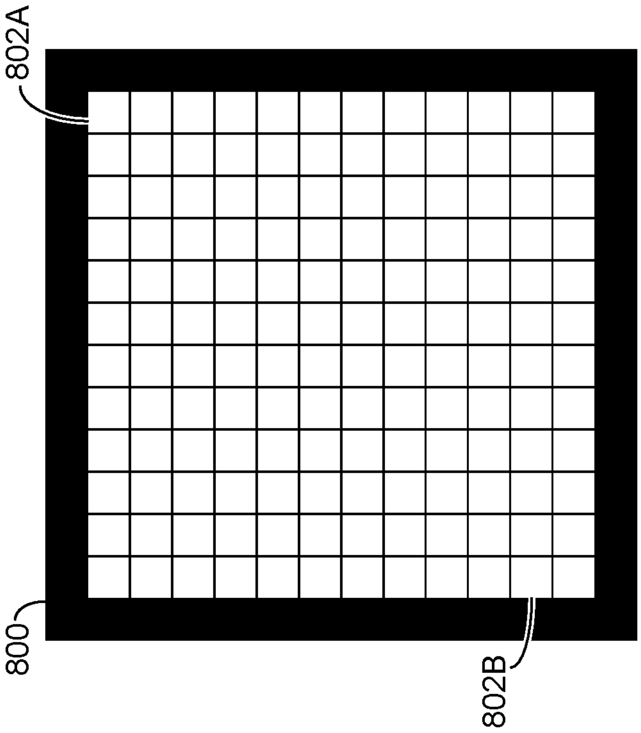

FIG. 8A schematically shows another example illumination light source 800. In this example, the illumination light source includes a plurality of individual light emitters, represented as a plurality of individual squares within the illumination light source. Two specific light emitters are labeled as light emitter 802A and light emitter 802B. Though not shown in FIG. 8A, each of the plurality of light emitters may be configured to emit corresponding illumination light out of the illumination light source—e.g., in a direction perpendicular to the plane of the page, relative to the perspective shown in FIG. 8A.

The plurality of light emitters may be implemented in any suitable way, using any suitable light-forming technology. As one non-limiting example, the plurality of light emitters may be implemented as light-emitting diodes (LEDs). For example, the illumination light source may use a plurality of micro-LEDs to emit illumination light into the external environment.

In the example of FIG. 8A, each of the plurality of light emitters are emitting illumination light, including light emitters 802A and 802B. This is indicated by the white fill pattern used for each of the plurality of light emitters. By contrast, in FIG. 8B, some of the light emitters have been deactivated. This is indicated by the shaded fill pattern used for some of the plurality of light emitters in FIG. 8B, including light emitter 802A. Others of the plurality of light emitters, including light emitter 802B, are still active in FIG. 8B.

In this manner, the logic machine may control the plurality of light emitters to affect the illumination light emitted by the illumination light source. Thus, in some examples, controlling the illumination light source to mitigate emission of the illumination light into the light restriction zone may include deactivating one or more of the plurality of individual light emitters—e.g., as is shown in FIG. 8B. For instance, based at least in part on determining that any particular light emitter is likely to emit illumination light that would enter the light restriction zone, the logic machine may deactivate that light emitter.

As discussed above, it will be understood that the examples illustrated in FIGS. 6A-B, 7A-B, and 8A-B are non-limiting. In general, an illumination light source may be controlled in any suitable way to mitigate emission of illumination light into a light restriction zone. Furthermore, it will be understood that the configurations shown in 6A-B, 7A-B, and 8A-B need not be mutually exclusive. For example, an illumination light source may include a plurality of controllable light emitters as is shown in FIGS. 8A and 8B, while also including a controllable gimbal as is shown in FIGS. 7A and 7B.

The present disclosure has thus far focused on defining a light restriction zone based at least in part on a static orientation of the illumination light source. However, it will be understood that the light restriction zone may be updated dynamically and the illumination light source may be controlled dynamically over time. For example, based at least in part on detecting a changed position and/or orientation of the illumination light source, the logic machine may dynamically control the illumination light source based at least in part on the changed position and/or orientation of the illumination light source to continue mitigating emission of the illumination light into the light restriction zone. In other words, steps of method 200 may be repeated at any suitable regular or irregular interval. In this manner, the logic machine may continue mitigating visibility of the illumination light to potential observers, even as the orientation and/or position of the illumination light source changes with respect to the external environment.

The present disclosure has thus far focused on mitigating emission of illumination light into a light restriction zone. However, in some cases, an illumination light source may be controlled based at least in part on one or more objects detected in the external environment—e.g., to increase an intensity of illumination light directed toward an object identified as being an object of interest.

Figure 9:
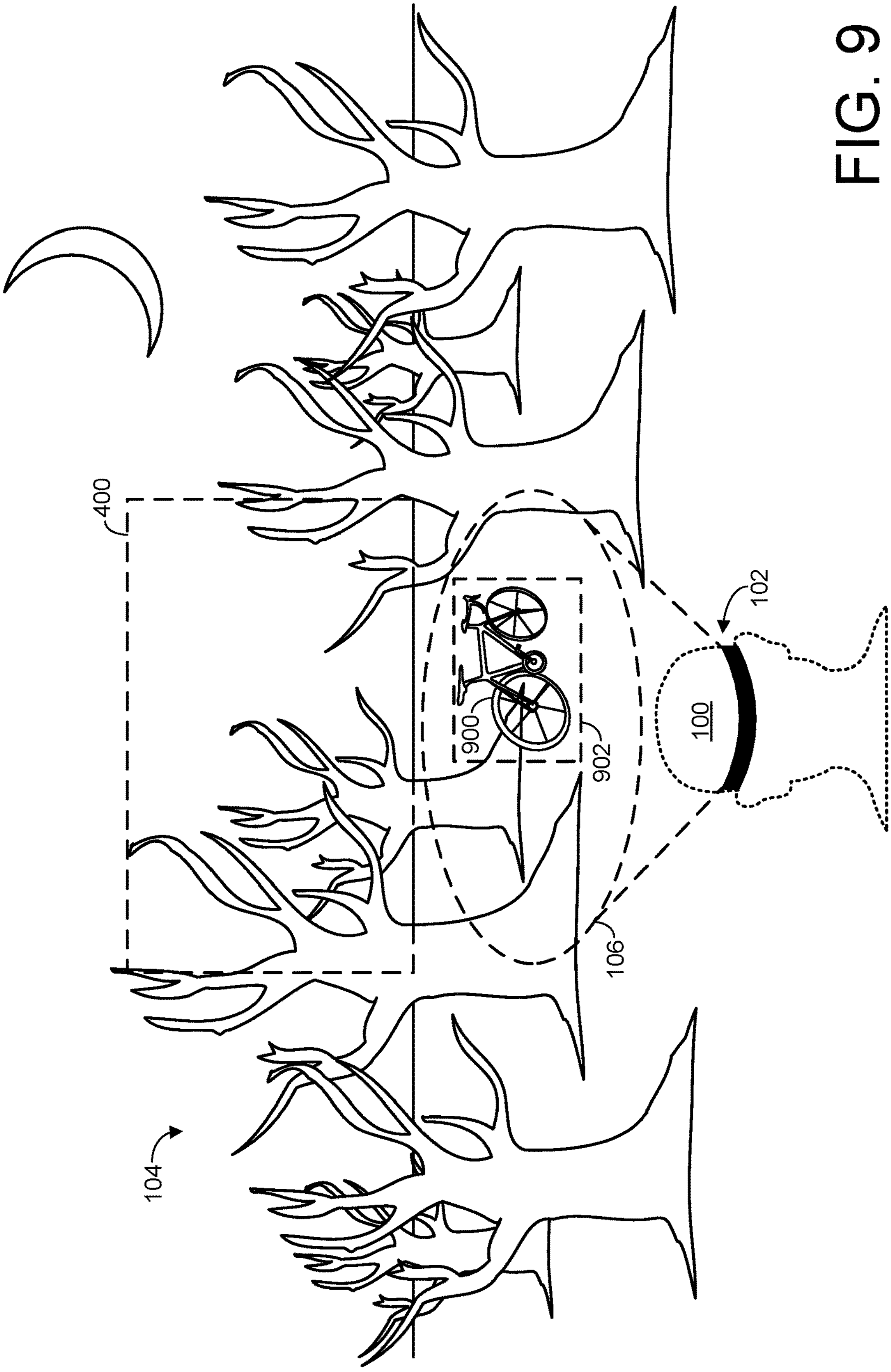
FIG. 9 schematically illustrates identifying an object in an external environment as being an object of interest.

This is schematically illustrated with respect to FIG. 9, which again shows user 100 in environment 104. Computing system 102 is causing emission of illumination light 106 toward a portion of the external environment outside of light restriction zone 400. However, in this example, an object 900 is present in environment 104. In this example, the object takes the form of a bicycle, although it will be understood that this is non-limiting. Rather, object 900 is intended to generally represent any suitable type of object that may be identified as an object of importance by the computing system.

Objects may be identified in any suitable way. As one non-limiting example, the computing system may include a camera (e.g., camera 314 of FIG. 3) configured to image the external environment. The computing system may then use suitable object recognition techniques to determine whether objects-of-interest are depicted in the captured images. This may be done, in some examples, via suitable machine-learning (ML) and/or artificial intelligence (AI) techniques. For example, the computing system may maintain a previously-trained machine-learning classifier configured to classify different pixels of an image as corresponding to objects of interest. In some cases, different classifiers may be used to recognize different types of objects—e.g., humans, animals, vehicles, and/or any other suitable objects. Additional examples of suitable AI and/or ML technologies are described below with respect to FIG. 10.

Upon identifying an object (such as object 900) as being an object of interest, the computing system may in some cases control the illumination light source to increase an intensity of the illumination light directed toward the object. For example, the computing system may maintain a mapping between different image-space positions corresponding to pixels of captured images, and illumination light emission angles of the illumination light source. In this manner, the illumination light source may be controlled to increase the intensity of illumination light directed toward the position of a recognized object.

As another example, the intensity of illumination light directed toward one or more identified objects may be decreased. This may be done, for example, to avoid pixel saturation if there are highly-reflective objects present in the external environment.

This may be done in various suitable ways as described above. As one example, the logic machine may increase an intensity of the illumination light emitted by one or more of a plurality of light emitters (e.g., micro-LEDs) of an illumination light source. This may provide improved visibility of the object of interest, while still reducing the visibility of the illumination light to potential outside observers by mitigating emission of the illumination light into the light restriction zone.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
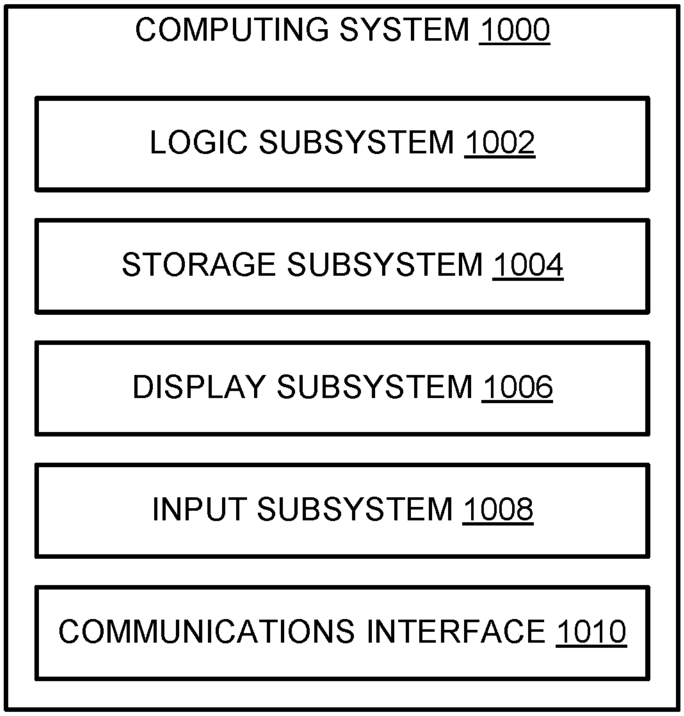
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a computing system comprises: an illumination light source configured to emit illumination light into an external environment; an orientation sensor configured to estimate an orientation of the illumination light source relative to the external environment; a logic subsystem; and a storage subsystem holding instructions executable by the logic subsystem to: define a light restriction zone within the external environment; and based at least in part on the orientation of the illumination light source, dynamically control the illumination light source to direct the illumination light toward at least a portion of the external environment outside the light restriction zone, while mitigating emission of the illumination light into the light restriction zone. In this example or any other example, the instructions are further executable to, upon detecting a changed position and/or orientation of the illumination light source, dynamically control the illumination light source based at least in part on the changed position and/or orientation of the illumination light source to continue mitigating emission of the illumination light into the light restriction zone. In this example or any other example, the light restriction zone is defined to include substantially all of the external environment above a horizon line from a perspective of the illumination light source. In this example or any other example, the computing system further comprises a camera configured to image the external environment, and wherein the horizon line is detected based at least in part on an image captured by the camera. In this example or any other example, the instructions are further executable to estimate a position of the illumination light source relative to a topographical model of the external environment, and wherein the light restriction zone is further defined based at least in part on the estimated position of the illumination light source relative to the topographical model. In this example or any other example, the computing system further comprises a global positioning system (GPS) sensor configured to detect a geographical position of the illumination light source, and the instructions are further executable to estimate the position of the illumination light source relative to the topographical model based at least in part on the geographical position detected by the GPS sensor. In this example or any other example, the computing system further comprises a magnetometer configured to estimate a bearing of the illumination light source, and wherein the light restriction zone is further defined based at least in part on the estimated bearing of the illumination light source. In this example or any other example, the topographical model is derived from a predefined topographical map of the external environment. In this example or any other example, the computing system further comprises a camera configured to image the external environment, and the topographical model is derived based at least in part on one or more images captured of the external environment by the camera. In this example or any other example, the light restriction zone is defined to reduce visibility of the illumination light from more than a threshold distance away from the illumination light source. In this example or any other example, the instructions are further executable to identify an object in the external environment outside of the light restriction zone as being an object of interest, and control the illumination light source to increase an intensity of the illumination light directed toward the object. In this example or any other example, the illumination light source includes a plurality of individual light emitters, and controlling the illumination light source to mitigate emission of the illumination light into the light restriction zone includes deactivating one or more of the plurality of individual light emitters. In this example or any other example, the illumination light source includes a controllable shutter, and controlling the illumination light source to mitigate emission of the illumination light into the light restriction zone includes controlling the controllable shutter to block emission of the illumination light into the light restriction zone. In this example or any other example, the illumination light source is coupled to a controllable gimbal, and controlling the illumination light source to mitigate emission of the illumination light into the light restriction zone includes controlling the controllable gimbal to aim the illumination light away from the light restriction zone. In this example or any other example, the illumination light includes visible wavelengths of light. In this example or any other example, the illumination light includes infrared wavelengths of light. In this example or any other example, the illumination light source is integrated into a wearable assembly configured to be worn on a head of a human user. In this example or any other example, the orientation sensor is an inertial measurement unit (IMU).

In an example, a method for illumination light restriction comprises: estimating an orientation of an illumination light source relative to an external environment, the illumination light source configured to emit illumination light into the external environment; defining a light restriction zone within the external environment; and based at least in part on the orientation of the illumination light source, dynamically controlling operation of the illumination light source to direct illumination light toward at least a portion of the external environment outside the light restriction zone, while mitigating emission of the illumination light into the light restriction zone.

In an example, a head-wearable computing system comprises: an illumination light source configured to emit illumination light into an external environment; a global positioning system (GPS) sensor configured to estimate a geographical position of the head-wearable computing system; an inertial measurement unit (IMU) configured to estimate an orientation of the head-wearable computing system relative to the external environment; a logic subsystem; and a storage subsystem holding instructions executable by the logic subsystem to: based at least in part on the geographical position of the head-wearable computing system, estimate a position of the head-wearable computing system relative to a topographical model of the external environment; define a light restriction zone within the external environment to reduce a visibility of the illumination light from more than a threshold distance away from the illumination light source; and based at least in part on the estimated position and the estimated orientation of the head-wearable computing system relative to the topographical model, dynamically control the illumination light source to direct the illumination light toward at least a portion of the external environment outside the light restriction zone, while mitigating emission of the illumination light into the light restriction zone.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:

an illumination light source configured to emit illumination light into an external environment;

an orientation sensor configured to estimate an orientation of the illumination light source relative to the external environment;

a logic subsystem; and a storage subsystem holding instructions executable by the logic subsystem to:

define a light restriction zone within the external environment based at least in part on a detected horizon line in the external environment, wherein the light restriction zone is defined to include substantially all of the external environment above the detected horizon line from a perspective of the illumination light source; and based at least in part on the orientation of the illumination light source, dynamically control the illumination light source to direct the illumination light toward at least a portion of the external environment outside the light restriction zone, while mitigating emission of the illumination light into the light restriction zone.

2. The computing system of claim 1, wherein the instructions are further executable to, upon detecting a changed position and/or orientation of the illumination light source, dynamically control the illumination light source based at least in part on the changed position and/or orientation of the illumination light source to continue mitigating emission of the illumination light into the light restriction zone.

3. The computing system of claim 1, further comprising a camera configured to image the external environment, and wherein the detected horizon line is detected based at least in part on an image captured by the camera.

4. The computing system of claim 1, wherein the instructions are further executable to estimate a position of the illumination light source relative to a topographical model of the external environment, and wherein the light restriction zone is further defined based at least in part on the estimated position of the illumination light source relative to the topographical model.

5. The computing system of claim 4, further comprising a global positioning system (GPS) sensor configured to detect a geographical position of the illumination light source, and wherein the instructions are further executable to estimate the position of the illumination light source relative to the topographical model based at least in part on the geographical position detected by the GPS sensor.

6. The computing system of claim 5, further comprising a magnetometer configured to estimate a bearing of the illumination light source, and wherein the light restriction zone is further defined based at least in part on the estimated bearing of the illumination light source.

7. The computing system of claim 4, wherein the topographical model is derived from a predefined topographical map of the external environment.

8. The computing system of claim 4, further comprising a camera configured to image the external environment, and wherein the topographical model is derived based at least in part on one or more images captured of the external environment by the camera.

9. The computing system of claim 4, wherein the light restriction zone is defined to reduce visibility of the illumination light from more than a threshold distance away from the illumination light source.

10. The computing system of claim 1, wherein the instructions are further executable to identify an object in the external environment outside of the light restriction zone as being an object of interest, and control the illumination light source to increase an intensity of the illumination light directed toward the object.

11. The computing system of claim 1, wherein the illumination light source includes a plurality of individual light emitters, and wherein controlling the illumination light source to mitigate emission of the illumination light into the light restriction zone includes deactivating one or more of the plurality of individual light emitters.

12. The computing system of claim 1, wherein the illumination light source includes a controllable shutter, and wherein controlling the illumination light source to mitigate emission of the illumination light into the light restriction zone includes controlling the controllable shutter to block emission of the illumination light into the light restriction zone.

13. The computing system of claim 1, wherein the illumination light source is coupled to a controllable gimbal, and wherein controlling the illumination light source to mitigate emission of the illumination light into the light restriction zone includes controlling the controllable gimbal to aim the illumination light away from the light restriction zone.

14. The computing system of claim 1, wherein the illumination light includes visible wavelengths of light.

15. The computing system of claim 1, wherein the illumination light includes infrared wavelengths of light.

16. The computing system of claim 1, wherein the illumination light source is integrated into a wearable assembly configured to be worn on a head of a human user.

17. The computing system of claim 1, wherein the orientation sensor is an inertial measurement unit (IMU).

18. A method for illumination light restriction, the method comprising:

estimating an orientation of an illumination light source relative to an external environment, the illumination light source configured to emit illumination light into the external environment;

defining a light restriction zone within the external environment based at least in part on an estimated position of the illumination light source relative to a topographical model of the external environment; and based at least in part on the orientation of the illumination light source, dynamically controlling operation of the illumination light source to direct illumination light toward at least a portion of the external environment outside the light restriction zone, while mitigating emission of the illumination light into the light restriction zone.

19. A head-wearable computing system, comprising:

an illumination light source configured to emit illumination light into an external environment;

a global positioning system (GPS) sensor configured to estimate a geographical position of the head-wearable computing system;

an inertial measurement unit (IMU) configured to estimate an orientation of the head-wearable computing system relative to the external environment;

a logic subsystem; and a storage subsystem holding instructions executable by the logic subsystem to:

based at least in part on the geographical position of the head-wearable computing system, estimate a position of the head-wearable computing system relative to a topographical model of the external environment;

define a light restriction zone within the external environment to reduce a visibility of the illumination light from more than a threshold distance away from the illumination light source; and based at least in part on the estimated position and the estimated orientation of the head-wearable computing system relative to the topographical model, dynamically control the illumination light source to direct the illumination light toward at least a portion of the external environment outside the light restriction zone, while mitigating emission of the illumination light into the light restriction zone.

* * * * *